United States Patent
Trimberger

(10) Patent No.: US 8,359,447 B1
(45) Date of Patent: Jan. 22, 2013

(54) SYSTEM AND METHOD OF DETECTING AND REVERSING DATA IMPRINTING IN MEMORY

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 915 days.

(21) Appl. No.: 12/354,721

(22) Filed: Jan. 15, 2009

(51) Int. Cl.
*G06F 21/00* (2006.01)
*G06F 13/00* (2006.01)

(52) U.S. Cl. .................. 711/170; 365/145; 365/190

(58) Field of Classification Search .................. None
See application file for complete search history.

(56) References Cited

U.S. PATENT DOCUMENTS

| | | | |
|---|---|---|---|
| 4,997,288 A | 3/1991 | Rosenow | |
| 5,661,730 A * | 8/1997 | Mitra et al. ................ | 714/720 |
| 6,781,864 B2 * | 8/2004 | Basceri et al. .............. | 365/145 |
| 6,917,974 B1 | 7/2005 | Stytz et al. | |
| 7,707,371 B1 | 4/2010 | Goheer et al. | |
| 2003/0094499 A1 | 5/2003 | Endo et al. | |
| 2004/0250091 A1 | 12/2004 | Henry et al. | |
| 2005/0238175 A1 | 10/2005 | Plotkin et al. | |
| 2006/0023486 A1 | 2/2006 | Furusawa et al. | |
| 2007/0047395 A1 | 3/2007 | Skeeter et al. | |
| 2007/0098158 A1 | 5/2007 | Tapson | |
| 2007/0300031 A1 | 12/2007 | Jevans et al. | |
| 2008/0002830 A1 | 1/2008 | Cherkasov et al. | |
| 2008/0126766 A1 | 5/2008 | Chheda et al. | |
| 2008/0192553 A1 * | 8/2008 | Backus et al. .............. | 365/190 |
| 2009/0100212 A1 | 4/2009 | Boyd et al. | |
| 2009/0168487 A1 * | 7/2009 | Rodriguez et al. .......... | 365/145 |
| 2010/0138619 A1 | 6/2010 | Benavides | |

OTHER PUBLICATIONS

U.S. Appl. No. 12/354,728, filed Jan. 15, 2009, Trimberger, Stephen M., Xilinx, Inc., 2100 Logic Drive, San Jose, CA 95124.
U.S. Appl. No. 12/031,355, filed Feb. 14, 2008, Trimberger, Stephen M., Xilinx, Inc., 2100 Logic Drive, San Jose, CA 95124.
Cisco Systems, Inc., Cisco MDS 9000 Family Secure Erase Configuration Guide for Cisco MDS 9500 and 9200 Series, Cisco MDS 9000 SAN-OS Release 3.4(1), Jun. 2008, pp. i-viii, 1-1 to 11.
Kissel et al., Guidelines for Media Sanitization, Recommendations of the National Institute of Standards and Technology, Sep. 2006, NIST Special Publication 800-88, pp. 1-43.
Kok, Guido, R., Data Remanence in Mircorcontrollers, Apr. 2007, University of Twente, pp. 1-17.
Gutmann, Peter; "Data Remenence in Semiconductor Devices. Abstract"; Security '01 Abstract; Security '01 Technical Program; downloaded on Feb. 11, 2008 from http://www.usenix.org/events/sec01/gutmann.html; pp. 1.

(Continued)

*Primary Examiner* — Kevin Verbrugge
*Assistant Examiner* — Stella Eun
(74) *Attorney, Agent, or Firm* — Murray Smith; Gerald Chan

(57) ABSTRACT

A method and system of detecting data imprinting in a memory is described. Data having known bit values is stored in a location in the memory and the data is read to determine the amount of the known bit values that can be successfully read after an attempt to erase the data. The amount of data that can be successfully read is compare to a threshold. Data bit values of a payload data are inverted to reverse the effects of data imprinting in response to the determined amount exceeding the threshold.

19 Claims, 4 Drawing Sheets

OTHER PUBLICATIONS

Gutmann, Peter; "Secure Deletion of Data from Magnetic and Solid-State Memory"; Sixth USENIX Security Symposium; downloaded on Feb. 5, 2008 from http://www.usenix.org/publications/library/proceedings/sec96/full_papers/gutmann'; pp. 77-90.

Trimberger, Steve; Security in SRAM FPGAs; IEEE Design and Test of Computers; Copublished by the IEEE CS and the IEEE CASS; Copyright 2007 IEEE; pp. 581.

Gutmann, Peter; "Data Remanence in Semiconductor Devices"; Last changes Apr.30, 2002; pp. 1-19.

Dyer, Joan G. et al.; "Building the IBM 4758 Secure Coprocessor"; Copyright 2001 IEEE; Oct. 2001; pp. 57-66.

* cited by examiner

SYSTEM AND METHOD OF DETECTING AND REVERSING DATA IMPRINTING IN MEMORY

CROSS-REFERENCE TO RELATED APPLICATIONS

This application relates to the following commonly assigned, co-pending U.S. application Ser. No. 12/354,728: "System and Method of Securing Data Stored in a Memory" by Trimberger, filed on the date hereof, which is hereby incorporated by reference in its entirety for all purposes.

FIELD OF THE INVENTION

This invention relates generally to data security, and in particular to a system and method of detecting and reversing data imprinting in a memory.

BACKGROUND

Deleting data from magnetic disk media and random-access memory may be accomplished by various methods, such as an erase operation where the memory data is overwritten with other data, a delete operation, or by removing power from the device. However, storing data indefinitely in magnetic disk media or random-access memory results in an aging effect which causes traces or remnants of data to remain even after a deletion or erasure operation or after power to the memory is shut off.

This aging effect, known as data imprinting, defeats the ability to completely erase information stored in a memory. The data traces or remnants may provide sufficient information to enable the recovery of data. The longer the information is stored in a memory cell, the greater the possibility that the data will be preserved by imprinting and subsequently detectable even after erasure or deletion. Data imprinting may pose special data storage problems for security or other applications where the complete or guaranteed destruction of sensitive data is highly desirable.

SUMMARY

This disclosure describes a method and system to detect and defeat data imprinting. The data field of a memory is configured to store a payload of data and a token indicative of the status of the payload data. Data imprinting of the payload data is detected and reversed.

According to an embodiment disclosed herein, a method of detecting data imprinting in a memory comprises storing a payload data to a first location in a first memory, storing a token to a second location in the first memory, the token indicative of a state of the payload data stored in the first memory, storing data having known bit values to a third location in a second memory, erasing the stored data in the third location of the second memory, reading the third location in the second memory, determining the amount of the known bit values successfully read from the third location and comparing the determined amount to a threshold, inverting bit values of the payload data to reverse effects of data imprinting in response to the determined amount exceeding the threshold, and updating the token in response to inverting the bit values of the payload data.

According to another embodiment disclosed herein, a method of detecting data imprinting in a memory comprises storing data having known bit values to a location in the memory, erasing the memory, reading the location in the memory, determining the amount of the known value successfully read and comparing the determined amount to a threshold, and transforming the stored data to reverse effects of data imprinting in response to the determined amount exceeding the threshold.

According to yet another embodiment disclosed herein, a system for securely processing information comprises a memory storing a payload data and a token associated with the payload data, the token indicative of a state of the payload data, a data imprint detector coupled to the memory operable to detect data imprinting, and operable to reverse effects of data imprinting taken place in the payload data in response to a threshold being exceeded, and a programmable logic device operable to read the payload data from the memory and process the payload data.

BRIEF DESCRIPTION OF THE DRAWINGS

For a more complete understanding of the disclosure and the advantages thereof, reference is now made to the accompanying drawings, wherein similar or identical reference numerals represent similar or identical items.

DETAILED DESCRIPTION

Figure 1A:
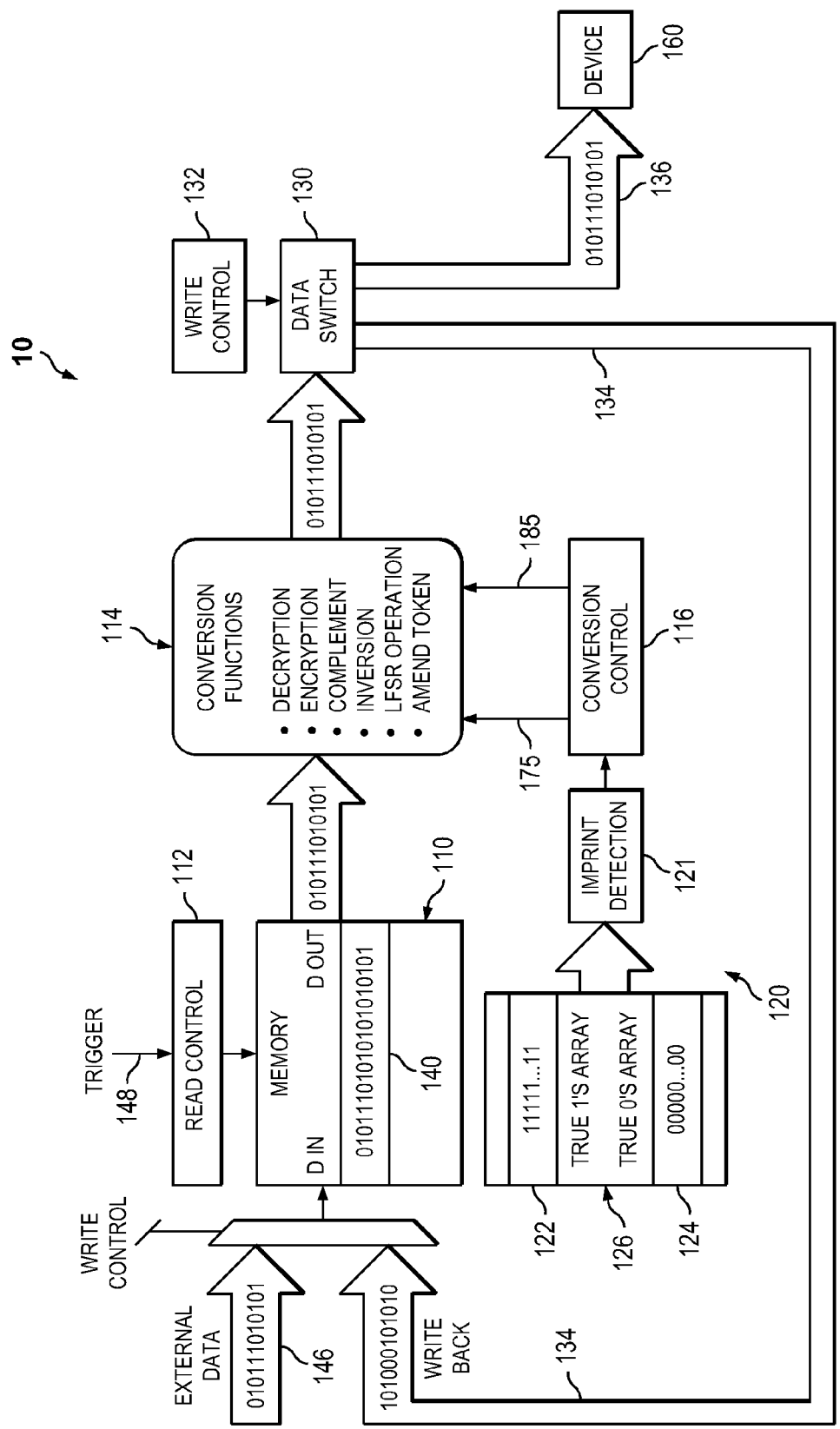
FIG. 1A is a logical block diagram according to one embodiment of the current disclosure.

FIG. 1A is a logical block diagram of a system 10 of detecting and reversing data imprinting. System 10 may reside within or operate in conjunction with an integrated, circuit such as a programmable logic device (PLD) or a field programmable gate array (FPGA), for example. System 10 includes a memory 110 operable to store data and coupled to a read controller 112. The read controller 112 controls or directs data access from the memory 110, which is output to a converter 114. The converter 114 is operable to perform a number of selectable functions or transformations on the data read from the memory 110 under the control of a conversion controller 116. The conversion controller 116 itself receives input from a data imprint detector 120. The data imprint detector 120 comprises an imprint detection module 121 operable to access the contents of a true 1's array 122 and a true 0's array 124 disposed in a second memory 126. The memory 110 and the second memory 126 should have identical or similar type, properties, and operating characteristics. Optionally, as described in more detail below, only one array may be used to accomplish the same function disclosed herein. Alternatively, the arrays 122 and 124 may be stored in the memory 110 where the payload data is stored.

By examining the contents of the true 1's array 122 and the true 0's array 124, the imprint detection module 121 is operable to detect when data imprinting has reached a threshold. When the threshold is reached or exceeded, the imprint detection module 121 provides input to the conversion controller 116 to perform a data inversion operation to negate the effects of data imprinting. The converted data from the output of converter 114 is provided to a data switch 130. The data switch 130, under the control of the write controller 132, selects a data path to output the converted data. Data path 134 directs the converted data back to the memory 110 for storage, and data path 124 directs the converted data to a device 160 for further processing, if desired.

The structure and operations of the system 10 are now described in more detail. System 10 includes the memory 110 having a data field 140 operable to store a payload data 142 (FIG. 1B) and a token 144 whose values may be selected from an external data 146 sourced from another device or writeback data 134 that is based on the value previously stored in the data field 140. The memory 110 may include, but is not limited to, magnetic disk, magnetic tape, EPROM, EEPROM, Flash memory, a static random access memory (SRAM), a dynamic random access memory (DRAM), a battery-backed RAM (BBRAM), a tag memory, or some other type of low leakage nonvolatile memory as may be known to one of ordinary skill in the art. In one embodiment, the memory 110 may be a memory organized as 32-bit words which may be serially written or accessed over multiple operational cycles. One of skill in the art should recognize that various memory device types of various organizations and sizes may be used. Storing data in the memory 110 begins the aging effect that may cause data imprinting. In some technologies, storing the data for an indefinite period of time causes imprinting of data in memory so that it can be recovered from the memory even though the memory has been erased. Imprinting may be increased by factors such as the duration of storage or by the number of times a data value has been written.

Figure 1B:
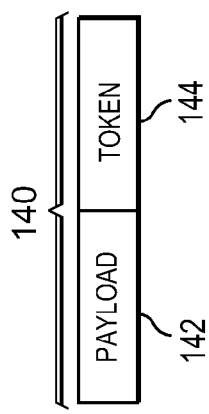
FIG. 1B is a diagram of a memory block depicted in FIG. 1A according to one embodiment of the current disclosure.

FIG. 1B shows the memory data field 140 in the memory 110. The memory data field 140 may be organized to include a payload data 142 and a token 144 associated with the payload data. The length and organization of memory data field 140 may vary depending on implementation. For example, the data field 140 may be organized into 32-bit data words or octets of a variable length. Many memory organizations may be possible, as would be readily apparent to one of ordinary skill in the art.

In some embodiments, the payload data 142 stored in the data field 140 may be confidential or sensitive data such as, for example, a social security number, a financial account number, a password, an encryption key, or other such information that may be considered private. As such, data imprinting leads to the confidential data still being retrievable even after erasure or power-down. The data may be stored in a true, complemented, and/or encrypted form. Other formats are possible, and one of skill in the art should recognize that other formats are possible and that the exemplary formats listed are not intended to be an exhaustive or exclusive listing.

The token 144 stored in the memory data field 140 may be a single-bit or multi-bit value. One purpose of the token 144 is to provide information about the format of the payload data 142, such as whether the value of the payload data has been converted in any way. For example, the token data 144 may be a binary "1" value if the payload data is stored in a complemented format, or a binary "0" value if payload data is stored as a true, non-complemented value.

Referring again to FIG. 1A, a trigger 148 may activate the read controller 112 to read the data field 140 from the memory 110. The trigger 148 may be configured to activate the read operation each time the device 160 powers up, for example. The trigger 148 may also be configured to activate in response to a timer. One of ordinary skill in the art should understand that other trigger activation sources may be possible. The device 160 may be a FPGA or another type of circuit or device.

The read controller 112 may start a read operation on a particular location in memory 110 to read out the data field 140. In one embodiment, the organization of the memory 110 may support a simultaneous read of the payload data 142 and the token data 144 from the memory 110. In another embodiment, the payload data 142 and the token data 144 may be accessed serially. The two data may also be read separately if they do not occupy the same 32-bit word, for example.

The data read from the data field 140 of the memory 110 is provided to the converter 114 under the control of the conversion controller 116. The converter 114 may perform a conversion of the payload data 142 and an amendment of the token data 144. The converter 114 is operable to, for example, encrypt, decrypt, invert, correct, modulo-4, data-bit shift, XOR, and perform other functions. These conversion operations are described in more detail below. Amending the token may include, but is not limited to, operations such as deletion, encryption, inversion, addition, and decryption.

In one embodiment, the conversion controller 116 may activate a writeback conversion signal 175 to perform a writeback conversion process. In an exemplary writeback conversion process, the data read from the data field 140 is converted according to some specified scheme and written back to the memory 110. The conversion controller 116 may operate in cooperation with the write controller 132 to control the writeback of data field 140.

In another embodiment, the conversion controller 116 may activate a correction conversion signal 185 to perform a correction conversion process. In a correction conversion process, the payload data read from the data field 140 may be corrected to its true value and used in subsequent processing. The converter 114 may perform data decryption or complementing the data, for example. These conversions would likely include amending the token value.

Various exemplary conversion operations, with writeback conversion and correction conversion, are described in more detail below.

The conversion controller 116 may be activated to perform the conversion functions upon a device power-up or when data is read from the data field 140 of the memory 110, for example. In another embodiment, activation of the conversion controller 116 may occur each time the data field 140 is read to be used by other processes or to be written back to memory 110. In yet another embodiment, activation of the conversion controller 116 may be in response to a signal, such as an external timer or an internal device signal.

The converter 114 may perform inversion operations on the payload data read from the memory 110. In such operations, the token may be a single-bit value that is used to indicate whether the payload data is stored in true or complement form. In one embodiment, the token value is set to binary "1" if the payload data value is stored in complemented form, and the token value is set to binary "0" if the payload data is not stored in complemented form.

In inversion operations involving a correction conversion, the data field 140 may be read from the memory 110, and each bit of the payload data 142 may be XORed with the token bit. The resulting corrected data may be used in further processing.

In inversion operations involving a writeback conversion, all bits of the payload data 142 and the token data 144 are inverted and then written back to the memory 110. This inversion operation is used, for example, when data imprinting has reached a predetermined threshold, as determined by the imprint detector 120. Details of the operations of the imprint detector 120 are set forth below. By inverting the data bits, the memory cells storing the data bits become un-imprinted, i.e., the cells imprinted with binary 0's will begin to be imprinted with 1's, and cells imprinted with binary 1's will begin to be imprinted with 0's. In this way, the effects of data imprinting is reversed, at least temporarily, until cells become imprinted by the inverted binary values.

As described above, the converter 114 may perform encryption and decryption operations. In such operations, the payload data 142 may function as a secret identifier such as a cryptographic key or part of a cryptographic key. The encryption and decryption operations may also be applicable for a correction conversion operation and a writeback conversion operation.

In encryption and decryption operations involving a correction conversion, the data read from the payload data is passed through a decryption algorithm. The result is then re-decrypted by a decryptor a predetermined number of times as may be indicated by the token value. The output of the decryptor would then be the corrected or true data that may be used in further processing.

In encryption and decryption operations involving a writeback conversion, the payload data may be read from memory and encrypted a predetermined number of times. The number of encryptions may be indicated by the value of the token. Another embodiment of the writeback conversion operation may involve the payload data being read from the memory 110 and encrypted, and the token being incremented. To prevent the token value from exceeding a predetermined range, the payload data may be decrypted a number of times to decrease its value and the token may be reset. The converted payload and amended token may then be written back to the memory 110.

In one embodiment, the conversion functions 114 may include a modulo-4 arithmetic operation. In modulo-4 operations, the token data 144 may be a two-bit field containing a number to be added to each two-bit subset of the payload data 120. In a modulo-4 operation involving a correction conversion, the data in the data field 140 may be read from the memory 110. The two-bit token 144 may be subtracted from each two-bit sub-field of the payload data 142. In a modulo-4 operation involving a writeback conversion, the data in the data field 140 may be read from the memory 110 and a one-bit value may be added to each pair of payload data bits and the token. The carry-out is dropped and the converted data field including the payload data 142 and the token data 144 may then be written back to memory 110.

In one embodiment, the converter 114 may function like a linear feedback shift register (LFSR). An LFSR may be used to generate pseudo-random numbers to scramble the payload data bits 142. The process of randomizing the payload bits may be effective in defeating the occurrence of data imprinting, because the bits that are stored are not correlated with the actual or true data that could represent sensitive data.

The token data 144 may represent an actual number or, in some embodiments, the token may be multiplied by some factor. For example, the token 144 may be multiplied by 1000 (×1000) to obtain a modified token result. The modified token result may then be used to step the LFSR. If the value of the token is "3," i.e., binary "11," the token value times 1000 (×1000) results in a modified token result of 3000. The modified token result of 3000 may then be used to step the LFSR. The size of the token field may be determined based on the randomization results desired by the payload data 142.

In LFSR operations involving a correction conversion, the data of the data field 140 is first read from the memory 110. The token data 144 may represent the number of times the payload data 142 has been stepped or shifted by the LFSR. The output of the LFSR may be XORed with payload data 142 to produce the corrected data, which may be used in further processing.

In LFSR operations involving a writeback conversion, the data in the data field 140 is read from the memory 110 and the payload data 142 is provided as input to an LFSR. The LFSR is then stepped or shifted another step and the result is XORed with the payload 142. The token data 144 may then be incremented.

In some LFSR operations, the value of token data 144 may be zero. When the token value is zero, the payload in the LFSR may be stepped or shifted by a certain predetermined number, and the resulting payload output may be XORed with the original payload value read from the data field.

The converted payload and amended token may be written back to memory 110 via datapath 134, or may be written to device 160 for further processing through datapath 136. The data switch 130 or other suitable routing device known to one of skill in the art may be used to select datapath 134 or 136. The write controller 132 may be used to control data switch 130 to select the desired datapath. It should be noted that the number of datapaths and the size of the control data switch may vary depending on implementation specifications. For example, there may be a plurality of devices in the system that require the use of the converted payload and amended token. In such a case, the number of datapaths and the size of the control data switch may be increased to accommodate the system requirements.

In the case of data imprint detection, the data path 134 would be selected in order to direct the inverted payload and token data back to the memory 110 for storage.

Figure 2:
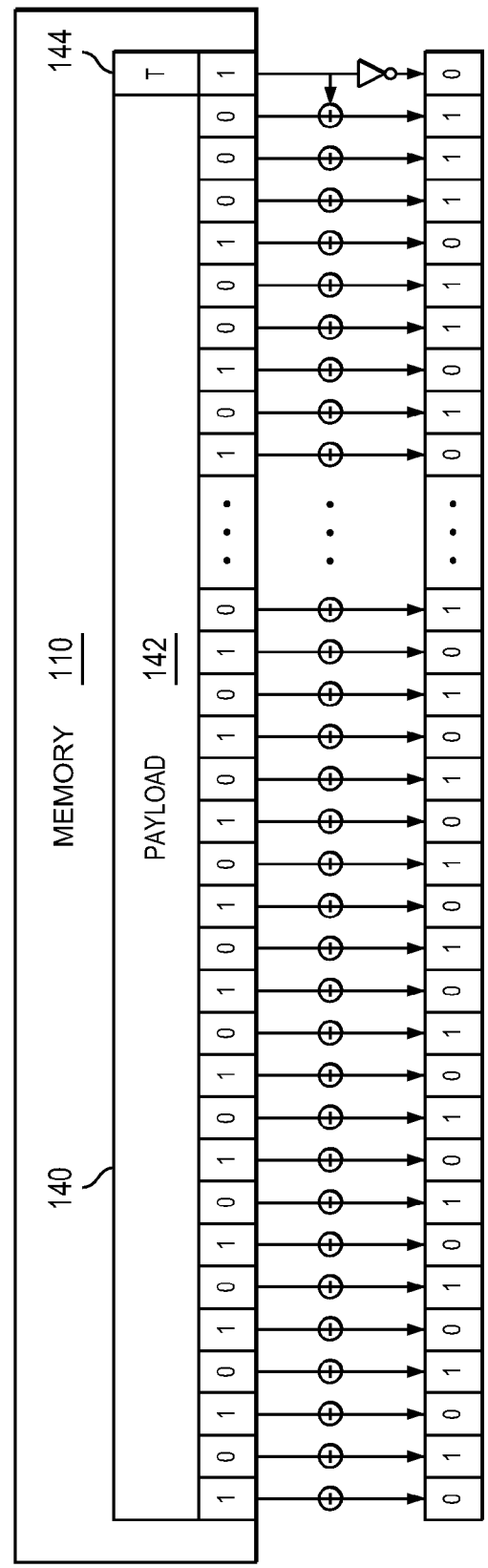
FIG. 2 is a more detailed diagram of the memory block storing a payload data and a token shown in FIG. 1B according to one embodiment of the current disclosure.

FIG. 2 is a more detailed diagram of the memory block storing the payload data 142 and token 144 shown in FIG. 1B according to one embodiment of the current disclosure. In memory 110, the payload data 142 comprises 256 bits and the token data 144 comprises 1 bit. For example, the 1-bit token 144 may be set to a value of binary "1" to indicate that the payload 142 is an inverted value, and set to a value of binary "0" to indicate that the payload 142 is not an inverted value. The token 144 and the payload 142 may be read from the memory 110 and an XOR operation, represented by the symbol ⊕, is performed on the payload data bits 142 using the token bit. The XOR operation results in an inversion of the payload 220 bit values. The resulting inverted payload 142 may later be written back and stored into the memory 110. The token 144 bit is then amended (inverted) to indicate the current inversion state of the payload data 142. Note that the non-inverted state may represent the true value or a complemented value, depending on the implementation.

Figure 3:
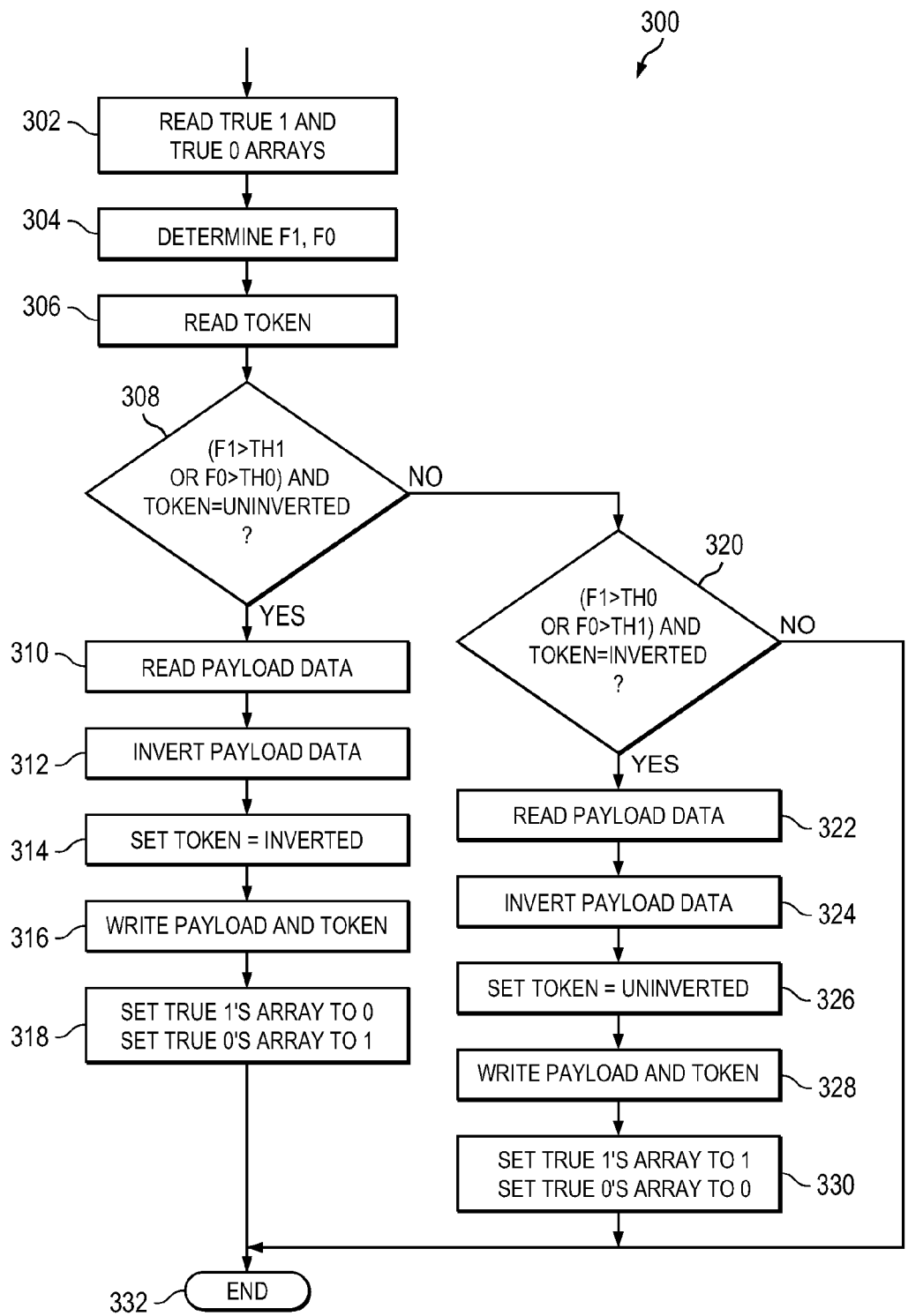
FIG. 3 is a flowchart of a method of preventing data imprinting in memory according to one embodiment of the current disclosure.

FIG. 3 is a flowchart of a method of preventing data imprinting in memory according to one embodiment. It is assumed that the payload data 142 and a token 144 are stored in the memory 110, the true 1's array 122 contains binary "1" in all of its data bits, and the true 0's array 124 contains binary "0" in all of its data bits. As the memory 110 and the arrays 122 and 124 store data over time, data imprinting gradually takes place. Prior to carrying out the procedure of FIG. 3, an attempt to "erase" the data in the true 1's array 122 and the true 0's array 124 is performed. This is done by putting the memory into a state to determine the imprinted value. For example in an SRAM, the erasing step may include removing power for a period of time determined by data remanence and then accessing the memory. Accessing the memory is preferentially done in the same manner as would be done to recover an imprinted memory. For an SRAM memory, this may include removing power from the memory and restoring power slowly. In block 302, the true 1's and 0's arrays are accessed and their contents read by the imprint detector 120. In block 304, functions F0 and F1 are determined to ascertain the percentage of data bits in the arrays that have been imprinted by binary 0's and 1's. The imprint detection may be performed upon power-up. The power-down period is sufficiently long to allow data to be erased from memory. However, if data imprinting has taken place, a memory read after power-up would still produce the data imprinted in the array. The functions F0 and F1 are indicative of the percentage of binary 0's and 1's that were successfully read from the arrays and thus the amount of imprinting that has taken place.

In block 306, the token data 144 is read from the memory 110. In block 308, a determination is made as to whether F1 is greater than a first threshold value, TH1, or F0 is greater than a second threshold value, TH0, and if the token data 144 indicates that the payload data 142 is un-inverted. If the determination yields a true value, then data imprinting has affected a sufficient number of data bits in the arrays. If, as determined in block 308, data imprinting has reached beyond the thresholds, then the payload data bits are read and inverted in blocks 310 and 312 to reverse the effects of data imprinting. In block 314, the token value is then inverted or otherwise amended to indicate that the payload value has been inverted. In block 316, both the converted payload and the token data are written back to the memory 110. Further, in block 318, the data bits in the true 0's array and true 1's array are also inverted to reverse the effects of data imprinting that has taken place in the arrays.

On the other hand If the determination in block 308 yields a false value, then in block 320 a determination is made as to whether F1 is greater than TH0 or F0 is greater than TH1, and whether the token data 144 indicates that the payload data 142 is inverted. If the determination in block 320 yields a true value, then the payload data is inverted to reverse the effects of data imprinting, as shown in blocks 322 and 324, and the token value is updated to indicate that the payload data is now un-inverted in block 326. The revised payload data 142 and token data are then written back to the memory 110 in block 328. The true 1's array data bits are then set to binary "1" and the true 0's array data bits are set to binary "0" to reverse data imprinted in the arrays. The method ends in block 332 if neither of the thresholds, TH0 and TH1, were exceed, indicating that the effects of data imprinting are still within a tolerable range.

The present method may also be implemented by using only one array. However, checking both polarities of the data bits (as described above) provides additional assurance, because data imprinting may be asymmetrical. The thresholds TH0 and TH1 should be set to protect against data theft. If the threshold is set at 60%, for example, the payload data bits can be read with 0.6 probability. The lower the threshold, the more uncertainty there is with the data that can be detected by unauthorized data access. However, if the threshold is set too low, the frequency with which the payload data and the data array values are converted may become unacceptable.

Figure 4:
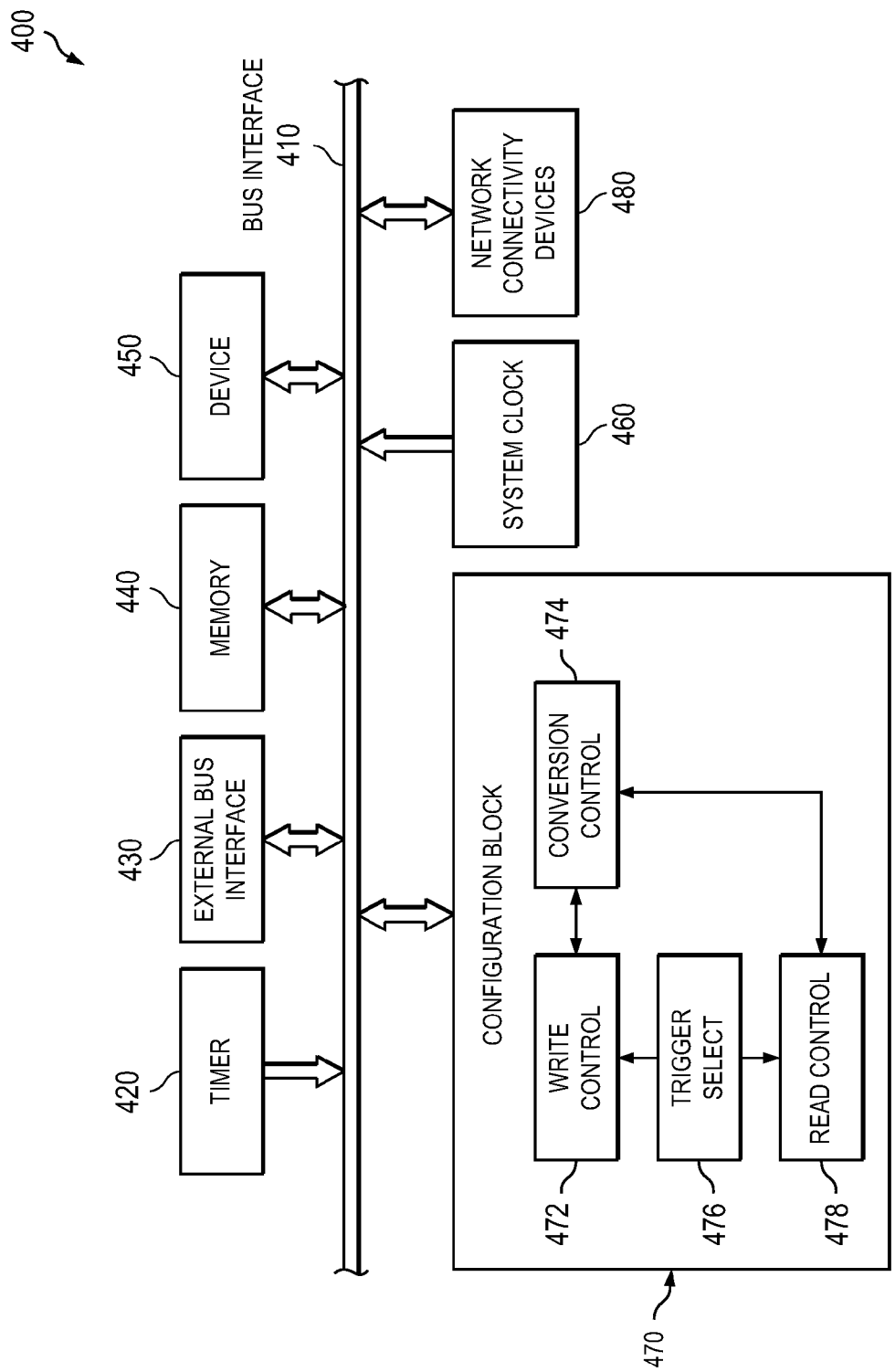
FIG. 4 is a block diagram of an exemplary environment that may be operable for various embodiments of the current disclosure.

FIG. 4 is a block diagram of an exemplary system 400 that may be operable for various embodiments of the current disclosure. The methods described herein may be implemented by any memory device or information processing system that uses devices for the storage of data. System 400 includes a memory 440 in communication with a device 450 through a bus interface 410. System 400 may also include a timer 420, external bus interface 430, system clock 460, configuration block 470, and network connectivity devices 480, for example, that communicate via the bus interface 410. The memory 440 may be external or internal to the device 450. In a preferred embodiment, the memory 440 may be a low leakage battery-backed RAM (BBRAM). The low leakage feature of the BBRAM would potentially extend the life of the battery and is energy efficient. However, other types of memory devices may be used, as would be recognized by one of skill in the art.

In one embodiment, the device 450 may be a central processing unit that executes instructions, codes, computer programs, and scripts, which it may access from the memory 440 or other network connectivity devices. The memory 440 may include computer readable media such as a RAM, ROM, PROM, hard disk, floppy disk, optical disk, or other secondary storage media. Further, the device 450 may be a programmable logic device (PLD).

The network connectivity devices 480 may take the form of modems, modem banks, Ethernet cards, universal serial bus (USB) interface cards, serial interfaces, token ring cards, fiber distributed data interface (FDDI) cards, wireless local area network (WLAN) cards, and other well-known network devices. The network connectivity devices 480 may enable the device 450 to communicate with the Internet, an intranets, and/or one or more computer networks. The network connection may enable the device 450 to receive information from a network or output information to the network in the course of performing the methods disclosed herein. The information may be represented as a sequence of instructions to be executed using device 450.

The configuration block 470 may include various components that control the processes in embodiments of this disclosure. Specifically, in the configuration block 470, a write control 472 may control the write processes to and from memory 440. The write control 472 may also control the write processes from the memory 440 to the device 450. A trigger select 476 may output a trigger signal that initiates the data field read from memory 540 in response to the occurrence of one or more conditions. A read control 478 may determine what data locations are read from the memory.

The conversion control 474 may determine whether a writeback conversion or correction conversion operation should be performed. One of skill in the art should recognize that the components of the configuration block 470 may vary based on implementations. Other component blocks may be required to implement system functions specific to a given design implementation.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various methods, techniques, or elements may be combined or integrated in another system, or certain features may be omitted or not implemented.

What is claimed is:

1. A method of detecting and reversing data imprinting in a memory, the method comprising:
   storing a payload data to a first location in a first memory;
   storing a token to a second location in the first memory, the token being indicative of a state of the payload data stored in the first memory;
   storing data having known bit values to a third location in a second memory;
   erasing the stored data in the third location of the second memory;
   reading the third location in the second memory;

determining the amount of the known bit values successfully read from the third location and comparing the determined amount to a threshold;
inverting bit values of the payload data to reverse effects of data imprinting in response to the determined amount exceeding the threshold; and
updating the token in response to inverting the bit values of the payload data.

2. The method of claim 1, further comprising inverting bit values of the data having known bit values in response to the determined amount exceeding the threshold.

3. The method of claim 1, wherein storing data having known bit values comprises:
storing a binary "1" to each bit of the third location in the second memory; and
storing a binary "0" to each bit of a fourth location in the second memory.

4. The method of claim 3, wherein determining the amount of the known value successfully read comprises:
determining a first percentage of binary "1" read from the bits of the third location in the second memory; and
determining a second percentage of binary "0" read from the bits of the fourth location in the second memory.

5. The method of claim 4, wherein comparing the determined amount to a threshold comprises:
comparing the first percentage to a first threshold; and
comparing the second percentage to a second threshold.

6. The method of claim 1, wherein erasing the stored data in the third location of the second memory comprises removing power from the second memory.

7. A method of detecting data imprinting in a memory, the method comprising,
storing data having known bit values to a location in the memory;
erasing the memory;
reading the location in the memory;
determining an amount of known bit values successfully read from the location in the memory and comparing the determined amount to a threshold, wherein the threshold represents a set amount of successfully read bit values;
transforming the stored data to reverse effects of data imprinting in response to the determined amount exceeding the threshold; and
inverting bit values of a payload data stored in another location in the memory to reverse effects of data imprinting in response to the determined amount exceeding the threshold.

8. The method of claim 7, wherein the transforming the stored data comprises inverting the bit values of the stored data.

9. The method of claim 8, comprising:
updating a token reflecting the inverted status of the stored payload data.

10. The method of claim 8, wherein storing data having known bit values comprises:
storing a binary "1" to each bit of a first array in the memory; and
storing a binary "0" to each bit of a second array in the memory.

11. The method of claim 10, wherein determining a percentage of the known bit values successfully read comprises:

determining a first percentage of binary "1" read from the first array; and
determining a second percentage of binary "0" read from the second array.

12. The method of claim 11, wherein comparing the determined percentage to a threshold comprises:
comparing the first percentage to a first threshold; and
comparing the second percentage to a second threshold.

13. The method of claim 8, further comprising:
storing a token to the memory, the token indicative of a state of the payload data stored in the memory; and
updating the token in response to inverting the bit values of the payload data.

14. The method of claim 7, wherein the transforming the stored data includes at least one of:
inverting the stored data;
complementing the stored data;
encrypting the stored data;
decrypting the stored data;
subjecting the stored data to a shift operation;
subjecting the stored data to an exclusive OR operation; and
subjecting the stored data to a modulo-4 operation.

15. The method of claim 7, erasing the memory comprises removing power from the memory.

16. A system for securely processing information, comprising:
a first memory storing a payload data and a token associated with the payload data, the token indicative of a state of the payload data;
a data imprint detector coupled to the memory operable to detect data imprinting, and operable to reverse effects of data imprinting taken place in the payload data in response to a threshold being exceeded, wherein the threshold corresponds to a set amount of successfully read bit values in a second memory; and
a programmable logic device operable to read the payload data from the first memory and process the payload data.

17. The system of claim 16, wherein the known bit values comprise:
a true 1's array storing a binary "1" in each bit; and
a true 0's array storing a binary "0" in each bit.

18. The system of claim 16, wherein the data imprint detector comprises a logic module operable to determine an extent of data imprinting that has taken place and comparing it to the threshold.

19. The system of claim 16, wherein the data imprint detector comprises:
the second memory;
a true 1's array in the second memory storing a binary "1" in each bit;
a true 0's array in the second memory storing a binary "0" in each bit; and
a logic module operable to determine an extent of data imprinting that has taken place in the true 1's array and comparing it to a first threshold; and
the logic module operable to determine an extent of data imprinting that has taken place in the true 0's array, and comparing it to a second threshold.

* * * * *